United States Patent
Lin et al.

(10) Patent No.: US 9,270,218 B2
(45) Date of Patent: Feb. 23, 2016

(54) POWER CONVERSION APPARATUS AND CONTROL METHOD THEREOF

(71) Applicant: NATIONAL CHENG KUNG UNIVERSITY, Tainan (TW)

(72) Inventors: Ray-Lee Lin, Tainan (TW); Lung-Shing Lin, Kaohsiung (TW)

(73) Assignee: National Cheng Kung University, Tainan (TW)

( * ) Notice: Subject to any disclaimer, the term of this patent is extended or adjusted under 35 U.S.C. 154(b) by 51 days.

(21) Appl. No.: 14/458,649

(22) Filed: Aug. 13, 2014

(65) Prior Publication Data

US 2015/0048805 A1 Feb. 19, 2015

(30) Foreign Application Priority Data

Aug. 16, 2013 (TW) .............................. 102129522 A (51) Int. Cl.
*H02P 9/00* (2006.01)
*H02P 9/14* (2006.01)
*H02P 9/48* (2006.01)
*H02P 101/15* (2015.01)

(52) U.S. Cl.
CPC .. *H02P 9/14* (2013.01); *H02P 9/48* (2013.01); *H02P 2101/15* (2015.01)

(58) Field of Classification Search
CPC ............... H02P 9/48; H02P 9/14; F03D 5/02; F03D 9/002; F03D 7/00
USPC ....................... 322/44, 20, 59, 77; 290/44, 55; 700/287, 288
See application file for complete search history.

(56) References Cited

U.S. PATENT DOCUMENTS

| | | | | | |
|---|---|---|---|---|---|
| 3,970,897 | A | * | 7/1976 | Tamir | H02H 7/09 361/113 |
| 4,477,765 | A | * | 10/1984 | Glennon | B64D 47/00 307/84 |
| 4,777,425 | A | * | 10/1988 | MacFarlane | H02P 9/102 322/25 |
| 5,495,163 | A | * | 2/1996 | Rozman | F02N 11/04 322/10 |
| 6,984,897 | B2 | * | 1/2006 | Skeist | H02P 9/02 290/1 R |
| 7,035,124 | B2 | * | 4/2006 | Chadwick | H02M 7/53871 322/25 |
| 7,157,885 | B2 | * | 1/2007 | Nakagawa | H02P 9/04 290/52 |
| 8,473,232 | B2 | * | 6/2013 | Imaizumi | G01R 27/02 324/713 |
| 8,674,647 | B2 | * | 3/2014 | Iwaji | B60L 15/025 318/400.01 |
| 2009/0085354 | A1 | * | 4/2009 | Tan | H02P 9/42 290/44 |

* cited by examiner

*Primary Examiner* — Julio C. Gonzalez Ramirez
(74) *Attorney, Agent, or Firm* — Muncy, Geissler, Olds & Lowe PC (57) ABSTRACT

An AC/DC conversion circuit of a power conversion apparatus receives an AC signal and has a switching element. A voltage sensing circuit generates a voltage reference signal according to an AC voltage signal. A harmonic generation circuit generates a harmonic injection signal according to the voltage reference signal. A subtraction circuit of a maximum power tracking circuit outputs a first DC signal and a second DC signal according to the voltage reference signal. An arithmetic circuit outputs a reference signal. A current sensing circuit outputs a feedforward signal according to one phase of an AC current signal. A current control circuit outputs an error signal according to the reference signal and the feedforward signal. A pulse width modulation circuit outputs a control signal to control the switching element according to the error signal and the harmonic injection signal, so that an aerogenerator operates at the maximum power approximation line.

20 Claims, 12 Drawing Sheets

POWER CONVERSION APPARATUS AND CONTROL METHOD THEREOF

CROSS REFERENCE TO RELATED APPLICATIONS

This Non-provisional application claims priority under 35 U.S.C. §119(a) on Patent Application No(s). 102129522 filed in Taiwan, Republic of China on Aug. 16, 2013, the entire contents of which are hereby incorporated by reference.

BACKGROUND OF THE INVENTION

1. Field of Invention

The invention relates to a power conversion apparatus and a control method thereof and, in particular, to a power conversion apparatus and a control method thereof which are applied to an aerogenerator.

2. Related Art

In recent years, owing to the rising awareness of environment protection and the depletion of fossil energy (e.g. oil, coal), the whole world is conscious of the importance of the alternative energy development. Since wind energy is inexhaustible in supply and always available for use, there is no doubt about the depletion of the energy source and no issue of energy monopoly. Therefore, the countries of the world energetically develop the aerogeneration system, and expects that the reliance on the fossil energy will be reduced by the increasing use of the wind energy. The power generation principle of an aerogenerator is described as below. The wind pressure caused by the flowing air is used to rotate the blades of the wind turbine so as to generate the mechanical energy, and then the mechanical energy is used to rotate the rotor of the power generator so as to generate the electric energy. Generally, before this electric energy outputted by the aerogenerator is used for the storage, loading or electric network, it needs to be converted by a power conversion apparatus.

Figure 1A:
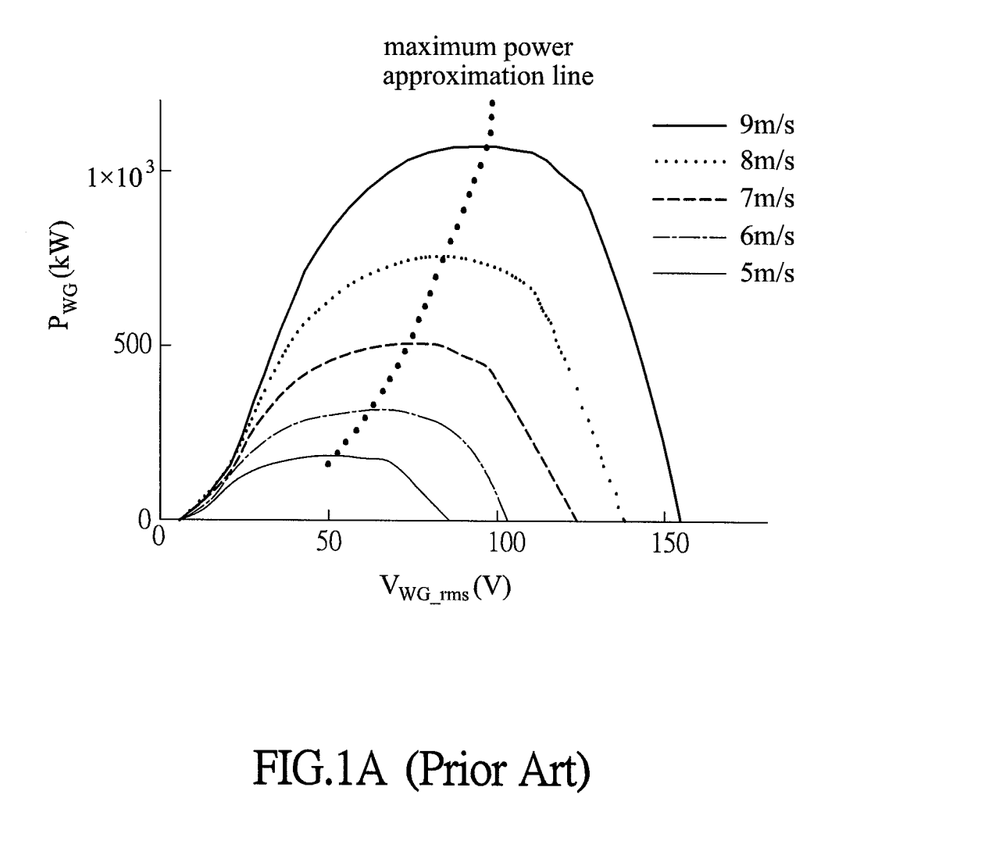
FIG. 1A is a characteristic curve diagram of the output power and the output voltage of a conventional aerogenerator under different wind speeds.
Figure 1B:
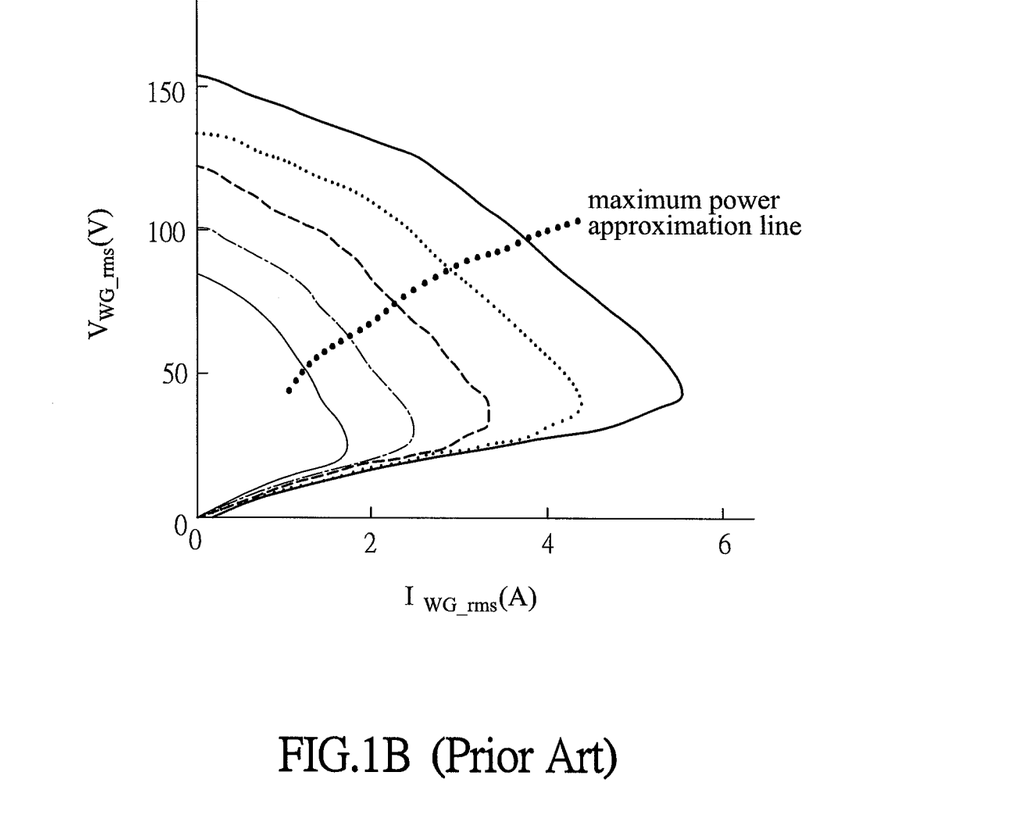
FIG. 1B is a characteristic curve diagram of the output voltage and the output current of a conventional aerogenerator under different wind speeds.

FIG. 1A is a characteristic curve diagram of the output power $P_{WG}$ (kW) and the output voltage $V_{WG\_rms}$ (root-mean-square value) of a conventional aerogenerator G under different wind speeds, and FIG. 1B is a characteristic curve diagram of the output voltage $V_{WG\_rms}$ (root-mean-square value) and the output current $I_{WG\_rms}$ (root-mean-square value) of a conventional aerogenerator G under different wind speeds.

As shown in FIGS. 1A and 1B, under different wind speeds, the aerogenerator G has different voltage and current values at the maximum power point. The maximum power point corresponding to each of the wind speeds can be connected together by an approximation line, i.e. a maximum power approximation line. Besides, the voltage value corresponding to the maximum power point under every wind speed can be found by the approximation line, and then the current value corresponding to the maximum power point can be obtained by using the voltage value and referring to the voltage/current characteristic curve in FIG. 1B.

Figure 1C:
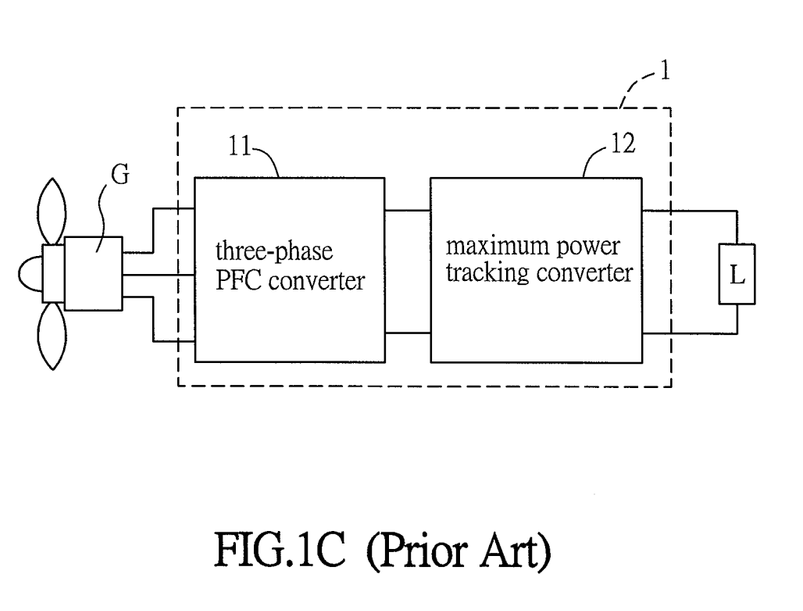
FIG. 1C is a schematic diagram of a conventional power conversion apparatus.

Moreover, FIG. 1C is a schematic diagram of a conventional power conversion apparatus 1. Herein, the power conversion apparatus 1 can receive the electric energy outputted by an aerogenerator G and then supply it to a loading L after the power conversion.

In the conventional art, in order to achieve the functions of maximum power tracking and three-phase power factor correction (PFC) to enhance the electromechanical conversion efficiency of the aerogenerator G, two converters are usually required for the implementation of the power conversion apparatus. One is a three-phase PFC converter 11 and the other is a maximum power tracking converter 12. The three-phase PFC converter 11 is used to make the three-phase current phase and the voltage phase outputted by the aerogenerator G close to each other or the same, so as to achieve a higher power factor to enhance the efficiency. The maximum power tracking converter 12 is used to make the aerogenerator G capable of operating at the maximum power point under different wind speeds, and that means the aerogenerator G operates at the maximum power approximation lines of FIGS. 1A and 1B. Therefore, the electromechanical conversion efficiency can be enhanced by the PFC converter 11 and the maximum power tracking converter 12 of the power conversion apparatus 1.

SUMMARY OF THE INVENTION

An objective of the invention is to provide a power conversion apparatus and a control method thereof which can not only achieve both of the maximum power limitation and power factor correction but also have advantages such as less components, lower cost and simpler control.

To achieve the above objective, a power conversion apparatus according to the invention is cooperated with an aerogenerator outputting an AC signal including an AC voltage signal and an AC current signal. The power conversion apparatus includes an AC/DC conversion circuit and a control module. The AC/DC conversion circuit receives the AC signal and outputs a voltage signal and includes a switching element. The control module includes a voltage sensing circuit, a harmonic generation circuit and a maximum power tracking circuit. The voltage sensing circuit generates a voltage reference signal according to the AC voltage signal. The harmonic generation circuit generates a harmonic injection signal according to the voltage reference signal. The maximum power tracking circuit includes a subtraction circuit, an arithmetic circuit, a current sensing circuit, a current control circuit and a pulse width modulation circuit. The subtraction circuit outputs a first DC signal and a second DC signal according to the voltage reference signal. The arithmetic circuit outputs a reference signal according to the first DC signal, the second DC signal and a voltage error signal. The current sensing circuit outputs a feedforward signal according to one phase of the AC current signal. The current control circuit outputs an error signal according to the reference signal and the feedforward signal. The pulse width modulation circuit outputs a control signal to control the switching element according to the error signal and the harmonic injection signal, so that the aerogenerator operates at the maximum power approximation line.

To achieve the above objective, a control method of a power conversion apparatus according to the invention is cooperated with an aerogenerator outputting an AC signal including an AC voltage signal and an AC current signal. The power conversion apparatus includes an AC/DC conversion circuit and a control module. The AC/DC conversion circuit receives the AC signal and outputs a voltage signal and includes a switching element. The control module includes a voltage sensing circuit, a harmonic generation circuit and a maximum power tracking circuit including a subtraction circuit, an arithmetic circuit, a current sensing circuit, a current control circuit and a pulse width modulation circuit. The control method includes steps of: generating a voltage reference signal according to the AC voltage signal by the voltage sensing circuit; generating a harmonic injection signal according to the voltage reference signal by the harmonic generation circuit; outputting a first DC signal and a second DC signal according to the voltage reference signal by the subtraction circuit; outputting a reference signal according to the first DC signal, the second DC signal and a voltage error signal by the arithmetic circuit; outputting a feedforward signal according to one phase of the AC current signal by the current sensing circuit; outputting an error signal according to the reference signal and the feedforward signal by the current control circuit; and outputting a control signal to control the switching element according to the error signal and the harmonic injection signal by the pulse width modulation circuit, so that the aerogenerator operates at the maximum power approximation line.

As mentioned above, in the power conversion apparatus and the control method thereof of the invention, the AC/DC conversion circuit of the power conversion apparatus receives the AC signal and outputs a voltage signal, and has a switching element. The control module includes a voltage sensing circuit, a harmonic generation circuit and a maximum power tracking circuit. The voltage sensing circuit generates a voltage reference signal according to the AC voltage signal. The harmonic generation circuit generates a harmonic injection signal according to the voltage reference signal. The maximum power tracking circuit includes a subtraction circuit, an arithmetic circuit, a current sensing circuit, a current control circuit and a pulse width modulation circuit. The subtraction circuit outputs a first DC signal and a second DC signal according to the voltage reference signal. The arithmetic circuit outputs a reference signal according to the first DC signal, the second DC signal and the voltage error signal. The current sensing circuit outputs a feedforward signal according to one phase of the AC current signal. The current control circuit outputs an error signal according to the reference signal and the feedforward signal. The pulse width modulation circuit outputs a control signal to control the switching element according to the error signal and the harmonic injection signal, so that the aerogenerator operates at the maximum power approximation line. Thereby, in comparison with the conventional art, the power conversion apparatus of this invention not only is a single-stage aerogeneration power converter, but also can achieve the functions of the maximum power limitation and three-phase power factor correction of the aerogenerator, and besides, have advantages such as less components, lower cost and simpler control.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 2A:
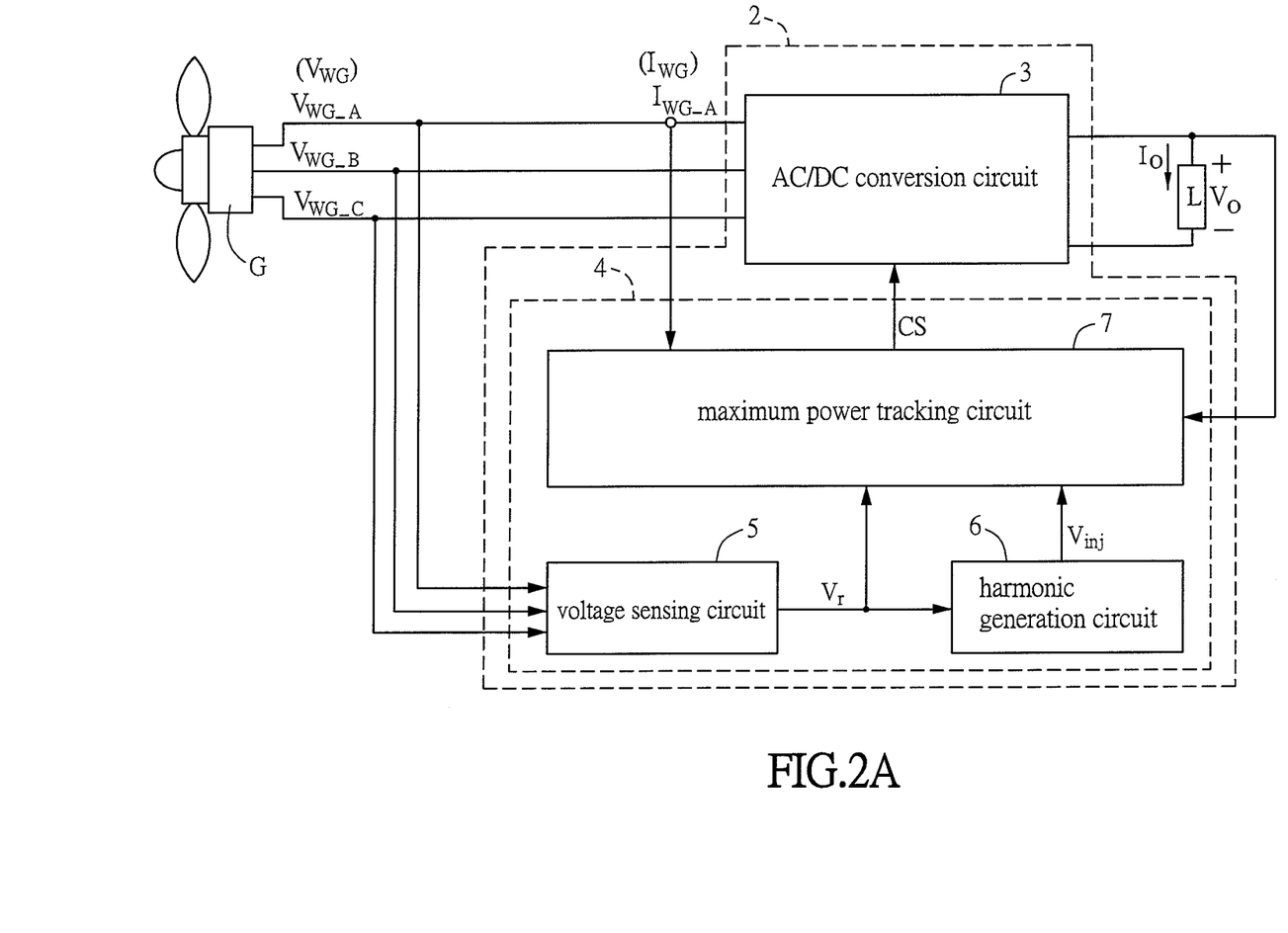
FIG. 2A is a schematic functional block diagram of a power conversion apparatus of an embodiment of the invention.
Figure 2B:
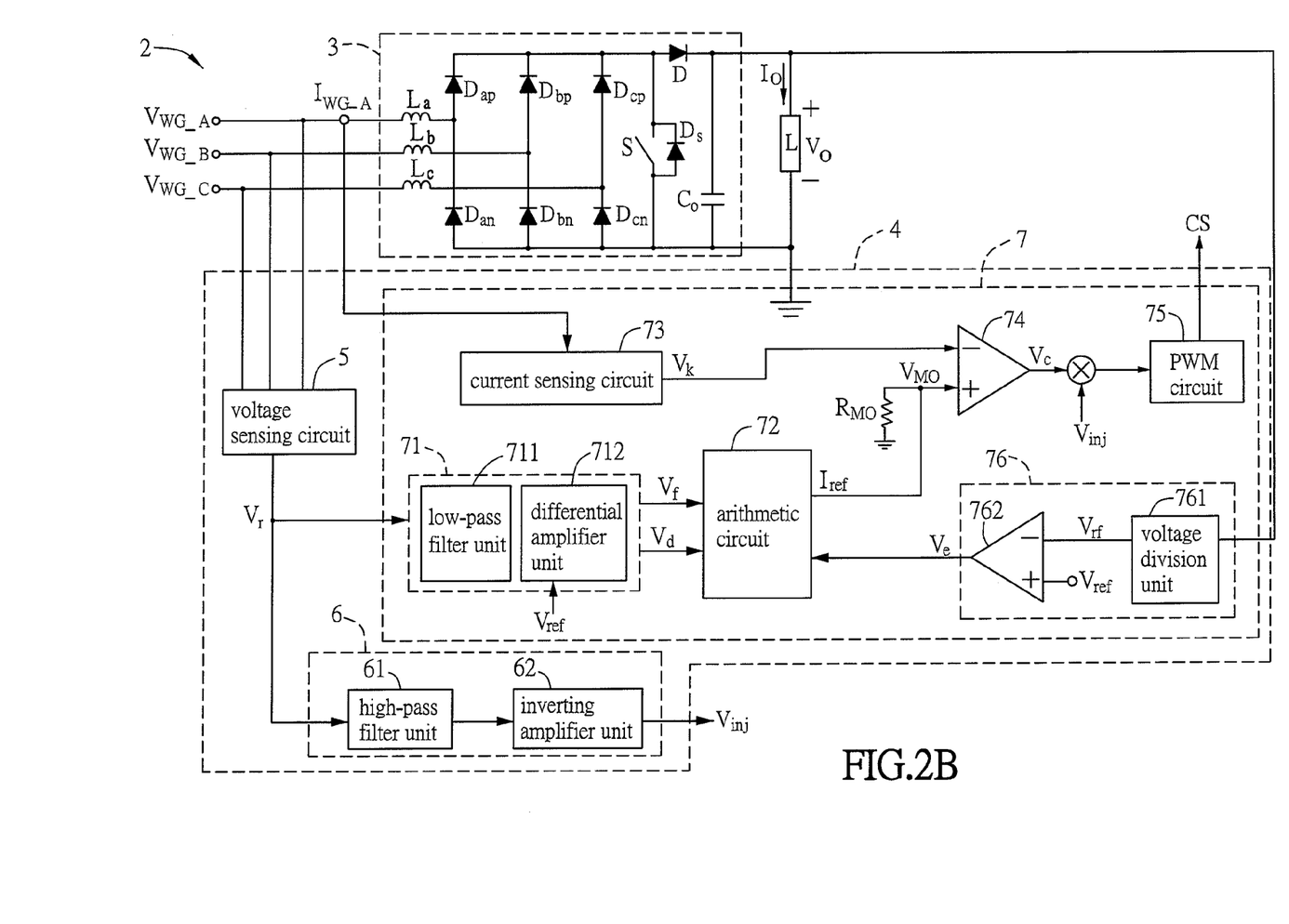
FIG. 2B is a schematic diagram of a part of the circuit of the power conversion apparatus in FIG. 2A.

FIG. 2A is a schematic functional block diagram of a power conversion apparatus 2 of an embodiment of the invention, and FIG. 2B is a schematic diagram of a part of the circuit of the power conversion apparatus 2 in FIG. 2A.

As shown in FIG. 2A, the power conversion apparatus 2 is cooperated with an aerogenerator G. The aerogenerator G can output an AC signal (three-phase AC signal), and the AC signal can contain an AC voltage signal $V_{WG}$ (including AC voltage signals $V_{WG\_A}$, $V_{WG\_B}$, $V_{WG\_C}$ of three phases) and an AC current signal $I_{WG}$ (including AC current signals of three phases but only $I_{WG\_A}$ is shown in FIG. 2A).

The power conversion apparatus 2 includes an AC/DC conversion circuit 3 and a control module 4. The control module 4 includes a voltage sensing circuit 5, a harmonic generation circuit 6 and a maximum power tracking circuit 7. Herein, the power conversion apparatus 2 is a single-stage aerogeneration power converter and can achieve the functions of maximum power limitation and three-phase power factor correction of the aerogenerator G at the same time. Moreover, the three-phase AC voltage signals $V_{WG\_A}$, $V_{WG\_B}$, $V_{WG\_C}$ outputted by the aerogenerator G can be inputted to the AC/DC conversion circuit 3 and the control module 4, and one phase of the three-phase AC current signals is inputted to the maximum power tracking circuit 7 of the control module 4. Herein, a current sensor (not shown) can be used to sense the output signal of the aerogenerator G so that any phase of the AC current signals can be obtained. The example here is provided by that the AC current signal $I_{WG\_A}$ is sensed and inputted to the maximum power tracking circuit 7. Of course, anyone of the other two phases of the AC current signals can be inputted to the maximum power tracking circuit 7. Besides, the AC/DC conversion circuit 3 receives the AC signal outputted by the aerogenerator G and outputs a voltage signal $V_O$ to a loading L.

As shown in FIG. 2B, in this embodiment, the AC/DC conversion circuit 3 is a three-phase single-switch boost converter and works in a discontinuous conduction mode. Since the AC signal outputted by the aerogenerator G is a three-phase signal, the AC/DC conversion circuit 3 is a three-phase circuit. However, because the AC/DC conversion circuit 3 only has a switching element S, it is a three-phase single-switch boost converter, with the advantages of less components, lower cost and simpler control. The AC/DC conversion circuit 3 further includes three inductors $L_a$, $L_b$, $L_c$, eight diodes $D_{ap}$, $D_{an}$, $D_{bp}$, $D_{bn}$, $D_{cp}$, $D_{cn}$, $D_s$, D and one capacitor $C_O$. The diodes $D_{ap}$, $D_{an}$, $D_{bp}$, $D_{bn}$, $D_{cp}$, $D_{cn}$ constitute a full-wave rectifier, which is electrically connected with the aerogenerator G through the inductors $L_a$, $L_b$, $L_c$. Moreover, two ends of the capacitor $C_O$ are electrically connected with one end of the diode D and a grounding end, respectively, and the diode $D_s$ is a body diode of the switching element S. Herein, since the three-phase single-switch boost converter belongs to the conventional art, the description thereof is omitted here for conciseness.

Figure 2C:
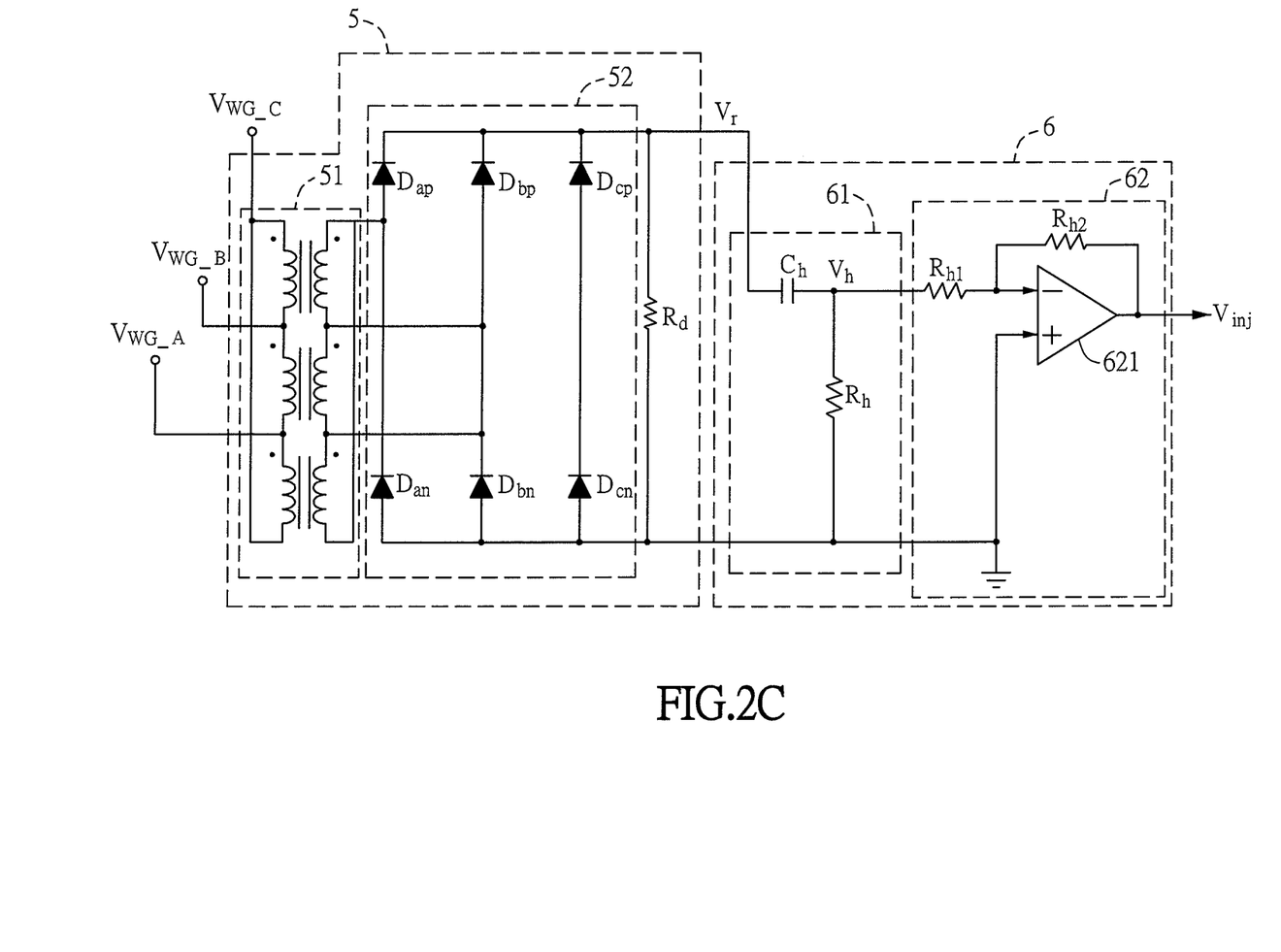
FIG. 2C is a schematic circuit diagram of the voltage sensing circuit and the harmonic generation circuit in FIG. 2B.
Figure 2D:
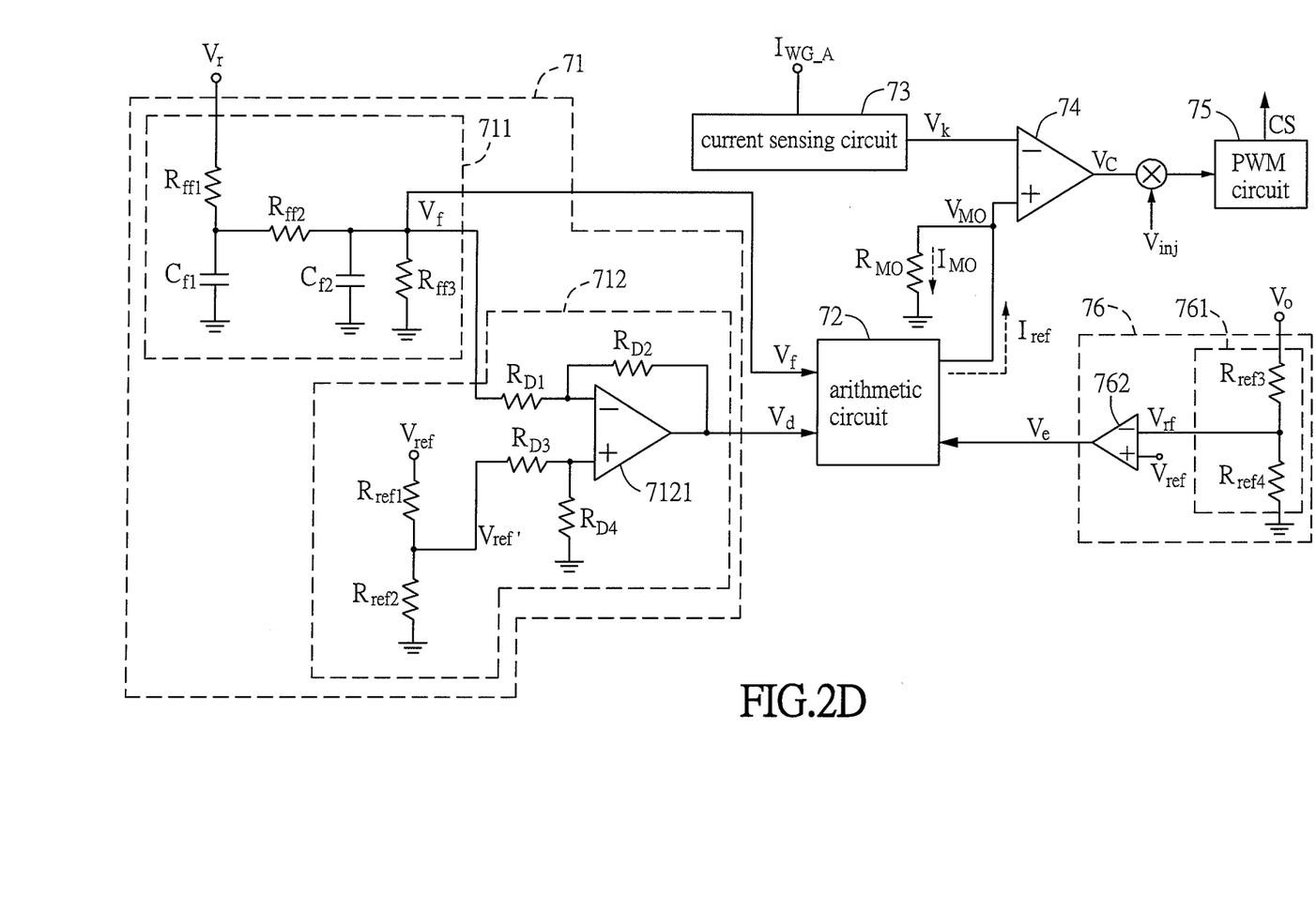
FIG. 2D is a schematic circuit diagram of the maximum power tracking circuit of the control module in FIG. 2B.
Figure 2E:
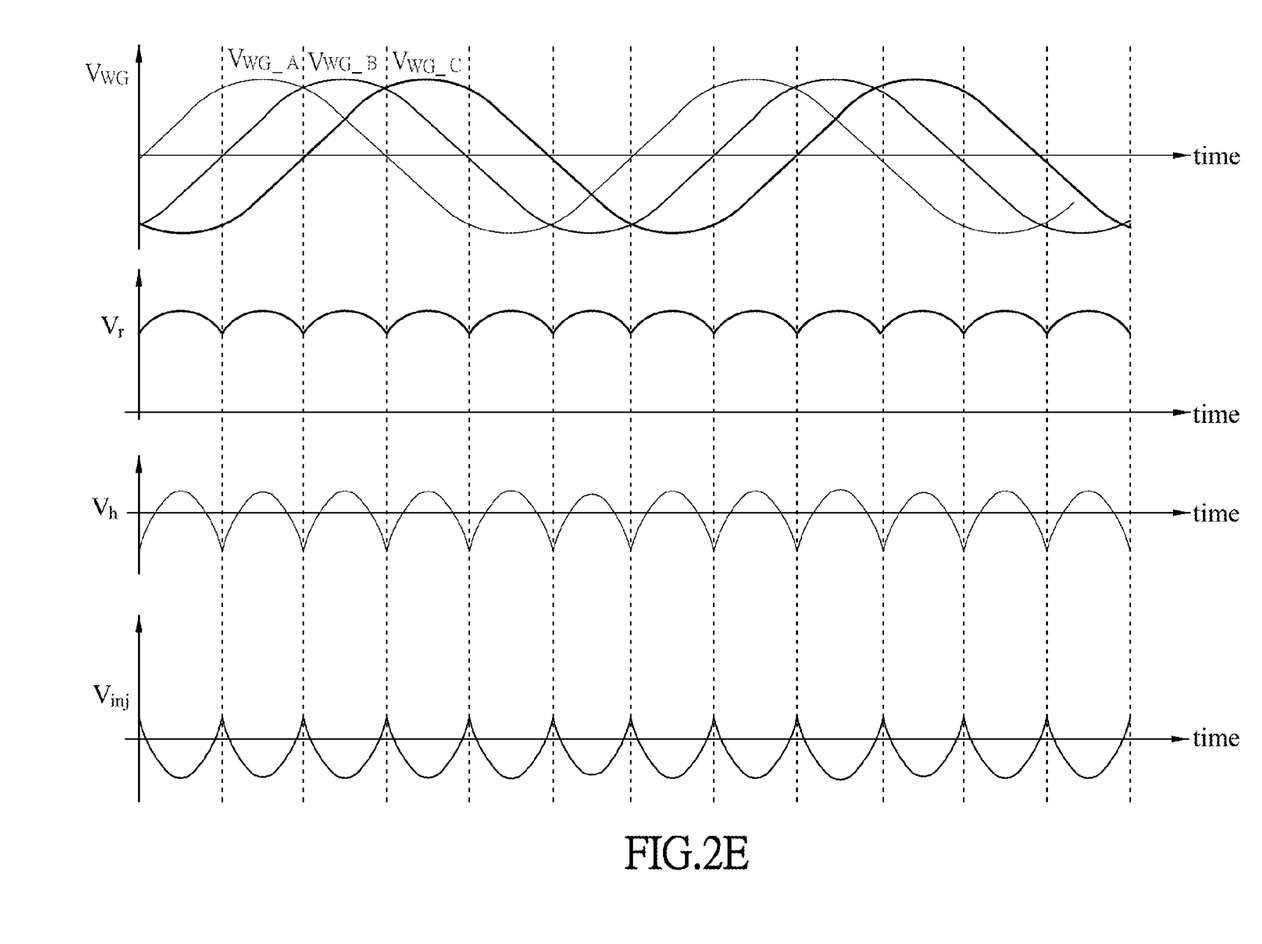
FIG. 2E is a schematic waveform diagram of the AC voltage signal, the voltage reference signal, the filter signal and the harmonic injection signal of the power conversion apparatus.

FIG. 2C is a schematic circuit diagram of the voltage sensing circuit 5 and the harmonic generation circuit 6 in FIG. 2B, FIG. 2D is a schematic circuit diagram of the maximum power tracking circuit 7 of the control module 4 in FIG. 2B, and FIG. 2E is a schematic waveform diagram of the AC voltage signal $V_{WG}$, the voltage reference signal $V_r$, the filter signal $V_h$ and the harmonic injection signal $V_{inj}$ of the power conversion apparatus 2.

As shown in FIGS. 2C to 2E, the voltage sensing circuit 5 generates a voltage reference signal $V_r$ according to the AC voltage signal $V_{WG}$. Herein, as shown in FIG. 2C, the voltage sensing circuit 5 includes a three-phase transformer 51, a full-bridge rectifying unit 52 and a resistor $R_d$, and the full-bridge rectifying unit 52 is electrically connected with the three-phase transformer 51 and the resistor $R_d$. The three-phase transformer 51 can reduce the voltage of the three-phase AC voltage signals $V_{WG\_A}$, $V_{WG\_B}$, $V_{WG\_C}$, and then the voltage reference signal $V_r$ is outputted after the rectification of the full-bridge rectifying unit 52. The voltage reference signal $V_r$ is connected to the two ends of the resistor $R_d$. Herein, as shown in FIG. 2E, the frequency of the voltage reference signal $V_r$ is 6 times that of the AC voltage signal $V_{WG}$, and the voltage reference signal $V_r$ can serve as the voltage feedforward signal of the maximum power tracking control mechanism.

As shown in FIG. 2C, the harmonic generation circuit 6 generates a harmonic injection signal $V_{inj}$ according to the voltage reference signal $V_r$. The harmonic generation circuit 6 includes a high-pass filter unit 61 and an inverting amplifier unit 62. The high-pass filter unit 61 includes a capacitor $C_h$ and a resistor $R_h$, and the inverting amplifier unit 62 includes two resistors $R_{h1}$, $R_{h2}$ and an amplifier 621. One end of the capacitor $C_h$ is connected with one end of the resistor $R_d$, and the other end of the capacitor $C_h$ is connected with one end of the resistor $R_h$ and one end of the resistor $R_{h1}$. Moreover, the negative end of the amplifier 621 is connected to the other end of the resistor $R_{h1}$, the positive end of the amplifier 621 is grounded, and the resistor $R_{h2}$ is connected with the negative end and output end of the amplifier 621. The high-pass filter unit 61 can filter out the low-frequency portion of the voltage reference signal $V_r$ and generate a filter signal $V_h$. Moreover, the resistor $R_{h1}$ and the resistor $R_{h2}$ of this embodiment have the same resistance, so the inverting amplifier unit 62 just inverts the phase of the filter signal $V_h$ without amplifying the filter signal $V_h$ so as to output the harmonic injection signal $V_{inj}$. As shown in FIG. 2E, since the frequency of the voltage reference signal $V_r$ is 6 times that of the AC voltage signal $V_{WG}$, the frequency of the harmonic injection signal $V_{inj}$ is also 6 times that of the AC voltage signal $V_{WG}$.

When the voltage conversion ratio of the AC/DC conversion circuit 3 is higher, the distortion of the waveforms of the input currents will be reduced and the power factor will become higher. On the contrary, when the voltage conversion ratio is lower, the distortion of the waveforms of the input currents will be increased and the power factor will become less. When the voltage conversion ratio of the AC/DC conversion circuit 3 is lower, the input currents of the AC/DC conversion circuit 3 will have larger fifth order harmonic, which leads to the distortion of the waveforms of the input currents. Therefore, in order to reduce the proportion of the fifth order harmonic, the higher harmonics can be added in the control signal to modulate the pulse width modulation signal to reduce the fifth order harmonic of the input currents. Thus, in order to improve the distortion of the three-phase AC input current signal at the low voltage conversion ratio of the three-phase single-switch boost converter, a modulation signal (i.e. the harmonic injection signal $V_{inj}$) is injected into the pulse width modulation signal of the AC/DC conversion circuit 3 in this invention, thereby reducing the distortion of the input currents. The frequency of the modulation signal (i.e. the harmonic injection signal $V_{inj}$) is six times that of the AC signal outputted by the aerogenerator G, so it can be called a sixfold frequency harmonic injection method.

As shown in FIGS. 2B and 2D, the maximum power tracking circuit 7 includes a subtraction circuit 71, an arithmetic circuit 72, a current sensing circuit 73, a current control circuit 74 and a pulse width modulation (PWM) circuit 75. Moreover, the maximum power tracking circuit 7 further includes a voltage feedback compensation circuit 76.

The subtraction circuit 71 outputs a first DC signal $V_f$ and a second DC signal $V_d$ according to the voltage reference signal $V_r$. The main function of the subtraction circuit 71 is to limit the output voltage and power of the aerogenerator G to the maximum power approximation line of the aerogenerator G. The subtraction circuit 71 includes a low-pass filter unit 711 and a differential amplifier unit 712. The low-pass filter unit 711 outputs the first DC signal $V_f$ according to the voltage reference signal $V_r$, and the differential amplifier unit 712 generates the second DC signal $V_d$ according to the first DC signal $V_f$ and a reference voltage $V_{ref}$. Herein, the first DC signal $V_f$ is generated through the low-pass filter unit 711 of the subtraction circuit 71, and then the second DC signal $V_d$ can be obtained by the subtraction between the first DC signal $V_f$ and the voltage division signal $V_{ref}'$ for serving as the reference signal of the maximum power tracking control mechanism. The low-pass filter unit 711 can filter out the low-frequency portion of the voltage reference signal $V_r$ and outputs the first DC signal $V_f$. The low-pass filter unit 711 includes three resistors $R_{f1}$, $R_{f2}$, $R_{f3}$ and two capacitors $C_{f1}$, $C_{f2}$. One end of the resistor $R_{f1}$ is electrically connected with one end of the capacitor $C_{f1}$, and the other end of the resistor $R_{f1}$ is electrically connected with the voltage reference signal $V_r$. One end of the resistor $R_{f2}$ is electrically connected with one end of the capacitor $C_{f1}$, one end of the capacitor $C_{f2}$ and one end of the resistor $R_{f3}$.

The differential amplifier unit 712 is used to obtain the second DC signal $V_d$ according to the voltage division signal $V_{ref}'$ and the first DC signal $V_f$. The voltage division signal $V_{ref}'$ is connected to the positive end of a subtractor 7121 through the resistor $R_{D3}$, and the first DC voltage signal $V_f$ is connected to the negative end of the subtractor 7121 through the resistor $R_{D1}$. Besides, the resistor $R_{D2}$ is connected to the negative end and output end of the subtractor 7121, and the resistor $R_{D4}$ is connected to the positive end of the subtractor 7121, one end of the resistor $R_{D3}$ and the grounding end. The voltage division signal $V_{ref}'$ is equal to $(R_{ref2}/(R_{ref1}+R_{ref2}))\times V_{ref}$, and the output end of the subtractor 7121 outputs the second DC signal $V_d$ to the arithmetic circuit 72. In this invention, the main function of the subtractor 7121 is to limit the operation points of the voltage, current and power outputted by the aerogenerator G to the approximation line of the maximum power points. When the power operation point of the aerogenerator G exceeds the maximum power point, the output voltage and current of the aerogenerator G can be limited by the operation of the subtractor 7121, so that the aerogenerator G operates at the maximum power approximation line.

The voltage feedback compensation circuit 76 outputs a voltage error signal $V_e$ according to the output voltage $V_O$ outputted by the AC/DC conversion circuit 3 and the reference voltage $V_{ref}$. The voltage error signal $V_e$ is inputted to the arithmetic circuit 72. Herein, the voltage error signal $V_e$ can provide the compensation for the control signal CS in response to the variation of the output voltage $V_O$ outputted by the AC/DC conversion circuit 3. The voltage feedback compensation circuit 76 includes a voltage division unit 761 and an error amplifier unit 762, and the voltage division unit 761 can execute a voltage division to the output voltage $V_O$ to output a voltage division signal $V_{rf}$. Herein, the voltage division unit 761 includes two resistors $R_{ref3}$, $R_{ref4}$, so the voltage division signal $V_{rf}$ outputted by the voltage division unit 761 is equal to $(R_{ref4}/(R_{ref3}+R_{ref4})) \times V_O$. The voltage division signal $V_{rf}$ is inputted to the negative end of the error amplifier unit 762, and the reference voltage $V_{ref}$ is inputted to the positive end of the error amplifier unit 762. The error amplifier unit 762 is a voltage error amplifier, and due to the characteristic of the voltage error amplifier, the value of the voltage division signal $V_{rf}$ and the waveform thereof are substantially the same as the reference voltage $V_{ref}$ (that means the voltage division signal $V_{rf}$ of the negative end will follow the variation of the reference voltage $V_{ref}$ of the positive end).

The arithmetic circuit 72 outputs a reference signal $I_{ref}$ according to the first DC signal $V_f$, the second DC signal $V_d$ and the voltage error signal $V_e$. In this embodiment, the arithmetic circuit 72 is a multiplier/divider unit, and can multiply the first DC signal $V_f$ by the voltage error signal $V_e$ and then divide the product by the square of the second DC signal $V_d$ to obtain the reference signal $I_{ref}$.

The current sensing circuit 73 outputs a feedforward signal $V_k$ according to one phase of the AC current signals $I_{WG}$. Herein, the current sensing circuit 73 outputs the feedforward signal $V_k$ according to the AC current signal $I_{WG\_A}$. Of course, the current sensing circuit 73 also can output the feedforward signal $V_k$ according to anyone of the other two phases of the AC current signals $I_{WG}$. The current sensing circuit 73 can include a Hall device (current transducer), a rectifying circuit and a low-pass filter (not shown). The AC current signal $I_{WG\_A}$ needs to be sensed by the current transducer, rectified by the rectifying circuit and then filtered by the low-pass filter filtering out the low-frequency signal so that the DC feedforward signal $V_k$ can be obtained and inputted to the current control circuit 74.

Besides, the maximum power tracking circuit 7 can further include a control resistor $R_{MO}$, which generates a control voltage $V_{MO}$ according to the reference signal $I_{ref}$. Herein, the control voltage $V_{MO}$ can be generated when the reference signal $I_{ref}$ flows into the control resistor $R_{MO}$ (the current $I_{MO}$), so the control voltage $V_{MO}$ is directly proportional to the reference signal $I_{ref}$. The control voltage $V_{MO}$ is inputted to the positive end of the current control circuit 74, and the feedforward signal $V_k$ is inputted to the negative end of the current control circuit 74. Moreover, the current control circuit 74 outputs an error signal $V_c$ according to the control voltage $V_{MO}$ and the feedforward signal $V_k$, and the error signal $V_c$ and the harmonic injection signal $V_{inj}$ are added together and then inputted to the pulse width modulation circuit 75. Herein, the current control circuit 74 is an average current control circuit and can be a current error amplifier.

The reference signal $I_{ref}$ is obtained according to the first DC signal $V_f$ and the second DC signal $V_d$, and the first DC signal $V_f$ and the second DC signal $V_d$ are the DC signals obtained after the filter and rectification of the low-pass filter unit 711. Besides, the error amplifier (current control circuit 74) can make the voltage value of the feedforward signal $V_k$ and the waveform thereof substantially the same as the control voltage $V_{MO}$ (that means the feedforward signal $V_k$ of the negative end of the current error amplifier will follow the variation of the control voltage $V_{MO}$ of the positive end). Therefore, the AC current signal $I_{WG}$ outputted by the aerogenerator G can follow control voltage value of the maximum power. Thereby, the maximum power tracking function is achieved.

The pulse width modulation circuit 75 outputs a control signal CS according to the error signal $V_c$ and the harmonic injection signal $V_{inj}$ outputted by the harmonic generation circuit 6. The control signal CS is inputted to the AC/DC conversion circuit 3 and controls the switching element S of the AC/DC conversion circuit 3 to make the phase and waveform of the AC current signal $I_{WG}$ substantially the same as the AC voltage signal $V_{WG}$ and also make the aerogenerator G operate at the maximum power point approximation line. Since the function of the subtraction circuit 71 is to limit the AC voltage signal $V_{WG}$ and the AC current signal $I_{WG}$, the aerogenerator G can be controlled to operate at the maximum power approximation line. Moreover, the harmonic injection signal $V_{inj}$ outputted by the harmonic generation circuit 6 is injected into the error signal $V_c$ to modulate the pulse width modulation signal to reduce the proportion of the fifth harmonic of the AC current signal waveform outputted by the aerogenerator G, and the power factor of the power conversion apparatus 2 can be thus improved. Therefore, the control signal CS outputted by the pulse width modulation circuit 75 can control the switching element S of the AC/DC conversion circuit 3 so as to make the phase and waveform of the AC current signal $I_{WG}$ substantially the same as the AC voltage signal $V_{WG}$ and also make the aerogenerator G operate at the maximum power approximation lines shown in FIGS. 1A and 1B.

Figure 3A:
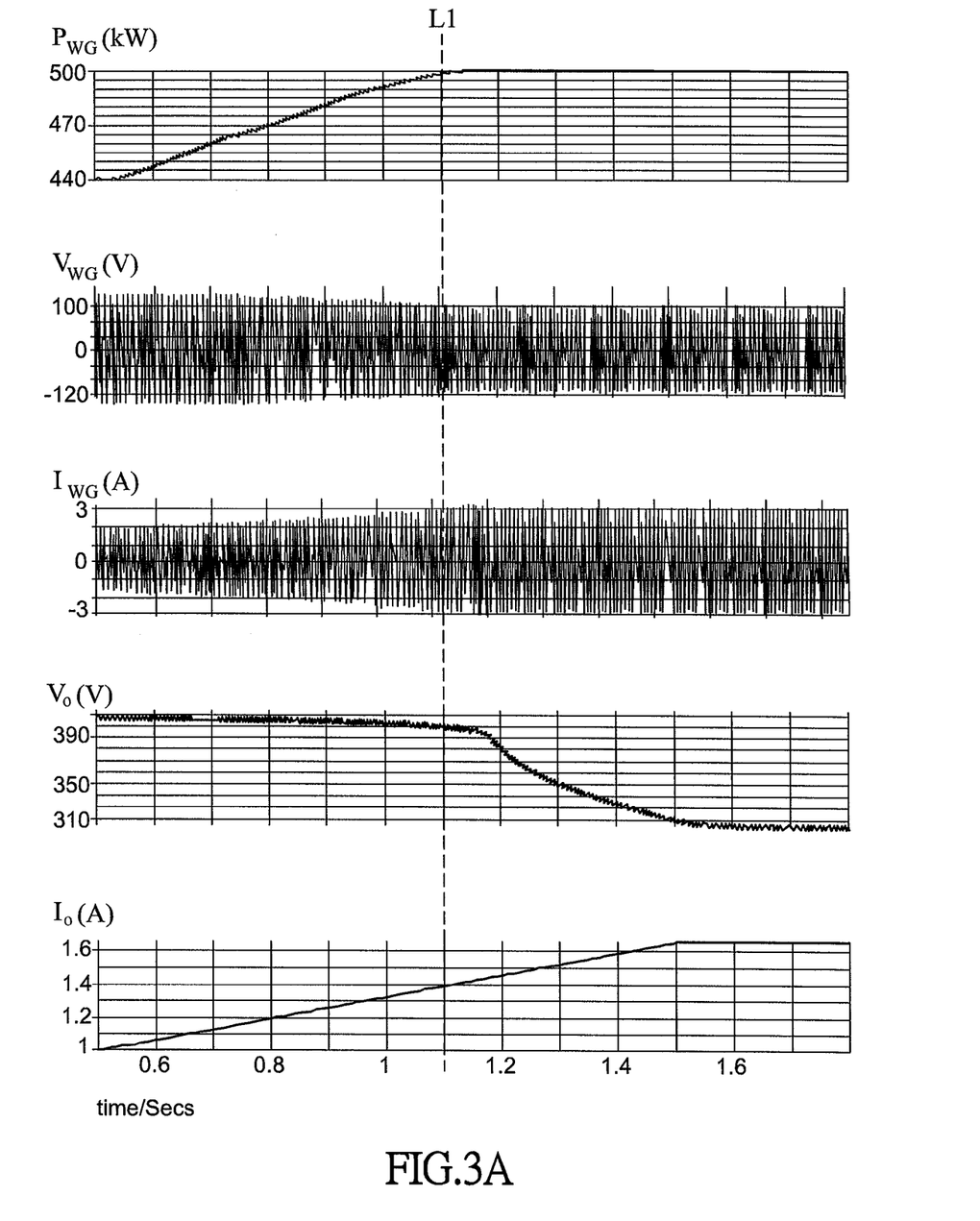
FIG. 3A is schematic waveform diagram of the input three-phase gross power of the power conversion apparatus, and the input voltage and current and output voltage and current thereof when the aerogenerator is operated under a specific wind speed.

FIG. 3A is schematic waveform diagram of the three-phase output power of the power conversion apparatus 2, and the input voltage and current and output voltage and current thereof when the aerogenerator G is operated under a specific wind speed (e.g. 9 m/s), wherein $P_{WG}$(kW) represents the three-phase output power (i.e. the three-phase power outputted by the aerogenerator G), $V_{WG}$(V) and $I_{WG}$(A) respectively represent the voltage and current inputted to the power conversion apparatus 2 (i.e. the voltage and current outputted by the aerogenerator G), $V_O$(V) and $I_O$(A) respectively represent the voltage and current outputted by the power conversion apparatus 2, and the values corresponding to the dotted line L1 are the values at the maximum power points.

As shown in FIG. 3A, when the loading current $I_O$ increases but the power of the aerogenerator G has not achieved the maximum power point, the output voltage $V_O$ of the power conversion apparatus 2 can be almost maintained at a constant value because the power conversion apparatus 2 of the invention is configured with the voltage feedback compensation circuit 76. However, when the loading current $I_O$ is continuingly increased and the power required for the loading rises to the maximum output power $P_{WG}$ of the aerogenerator G, the maximum output power $P_{WG}$ of the aerogenerator G will be limited to the maximum power point (i.e. the value corresponding to the dotted line L1) due to the full-load current of the AC/DC conversion circuit 3. If the power required for the loading continuingly rises and exceeds the maximum output power $P_{WG}$ of the aerogenerator G (that means the loading current $I_O$ exceeds the full-load current of the AC/DC conversion circuit 3), the output voltage $V_O$ of the power conversion apparatus 2 will be pulled down because the output power $P_{WG}$ of the aerogenerator G has been limited to the maximum power point. Meanwhile, the AC voltage signal $V_{WG}$ and the AC current signal $I_{WG}$ outputted by the aerogenerator G will also be limited to the voltage and current values corresponding to the maximum power point, respectively.

Figure 3B:
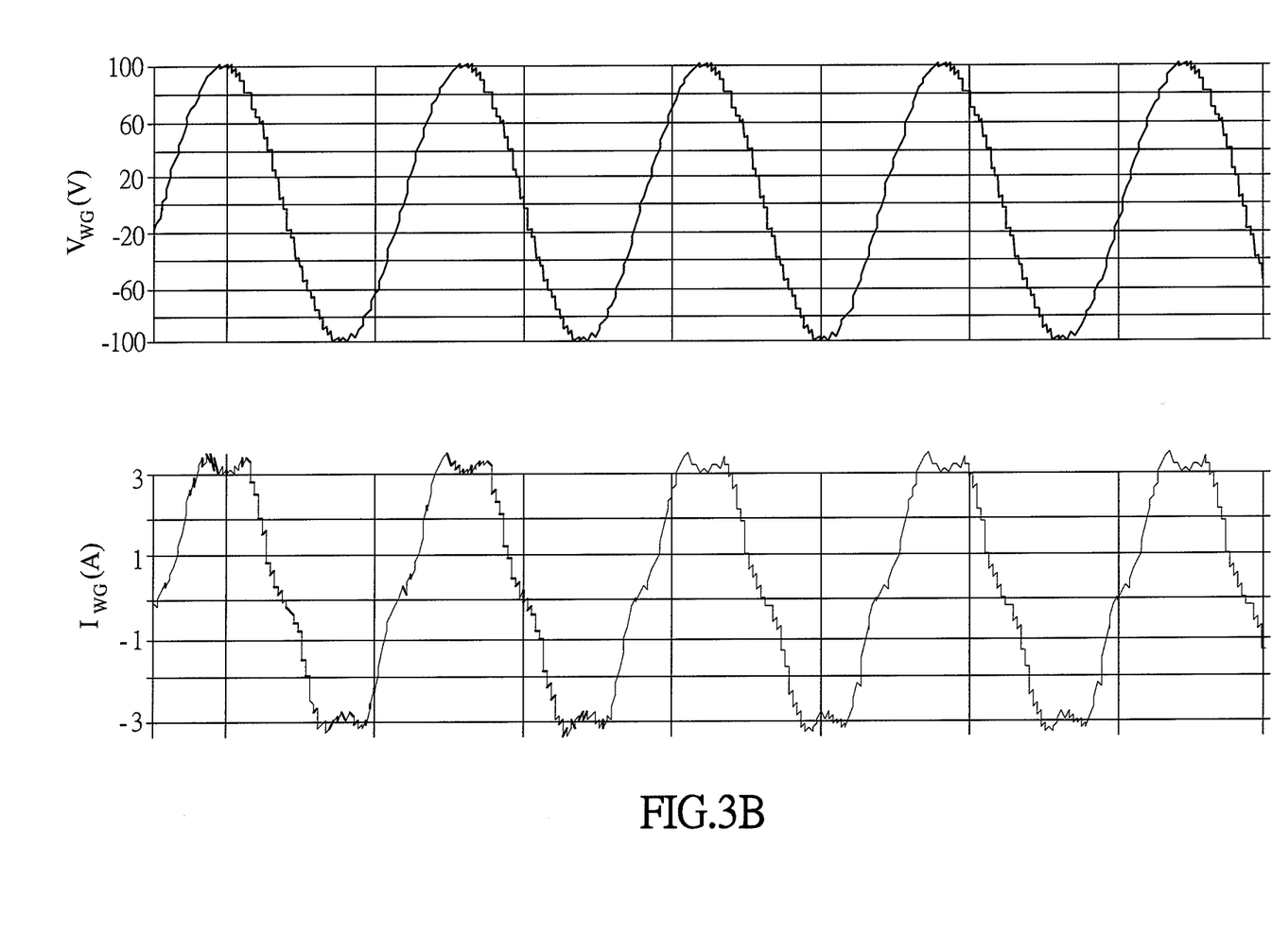
FIG. 3B is a schematic waveform diagram of the three-phase voltage and current of the aerogenerator under a specific wind speed.
Figure 3C:
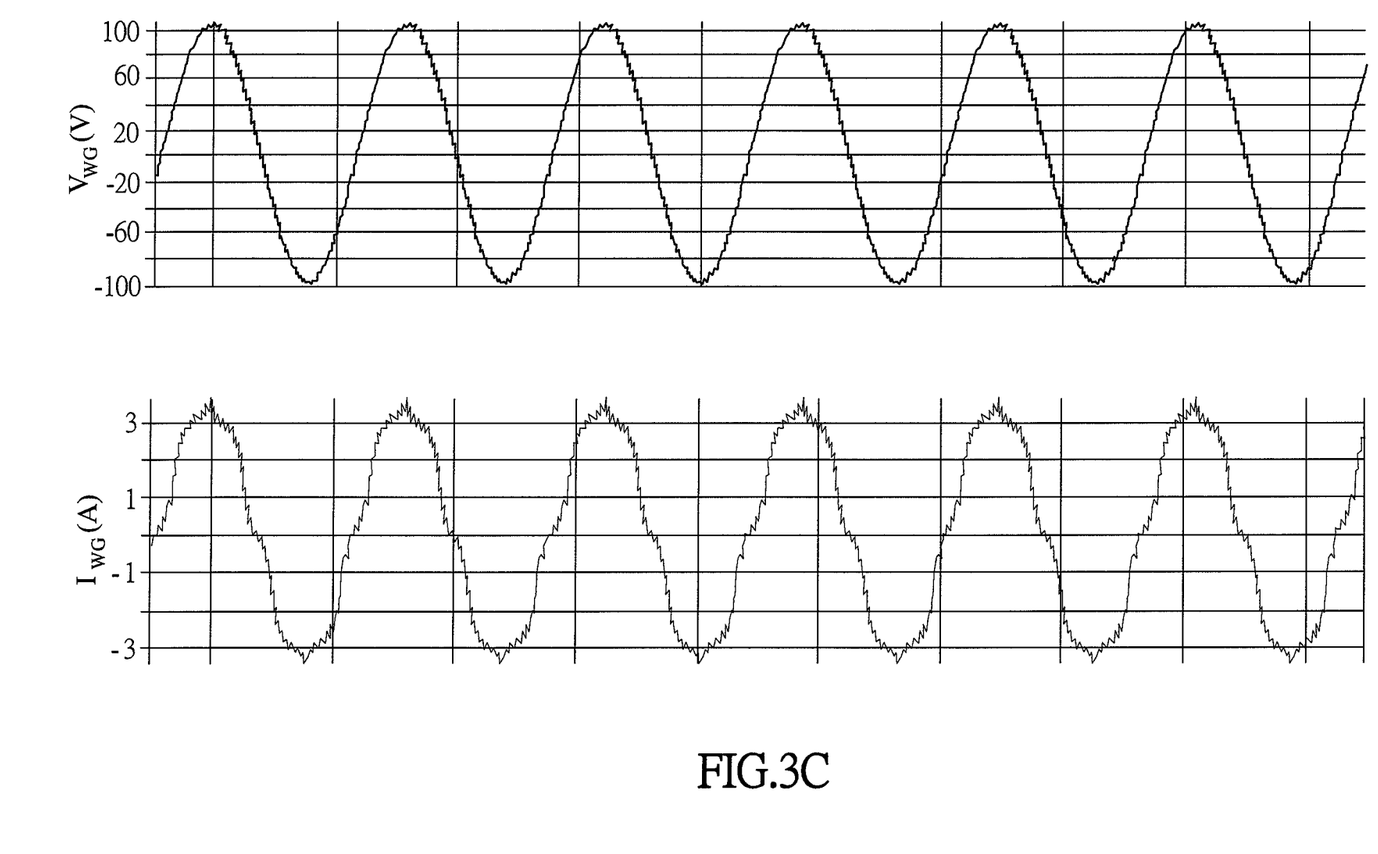
FIG. 3C is a schematic waveform diagram of the three-phase voltage and current of the aerogenerator under a specific wind speed when the power conversion apparatus is operated.

FIG. 3B is a schematic waveform diagram of the three-phase voltage and current of the aerogenerator G under a specific wind speed (e.g. 9 m/s), and FIG. 3C is a schematic waveform diagram of the three-phase voltage and current of the aerogenerator G under the specific wind speed (e.g. 9 m/s) when the power conversion apparatus 2 is operated.

By the comparison between FIGS. 3B and 3C, the harmonic injection mechanism of the power conversion apparatus 2 can reduce the waveform distortion of the AC current signal $I_{WG}$ outputted by the aerogenerator G, and besides, the waveform of the AC current signal $I_{WG}$ also can follow the waveform of the output AC voltage signal $V_{WG}$, which demonstrates the power conversion apparatus 2 of this invention is configured with the function of three-phase power factor correction.

Figure 4:
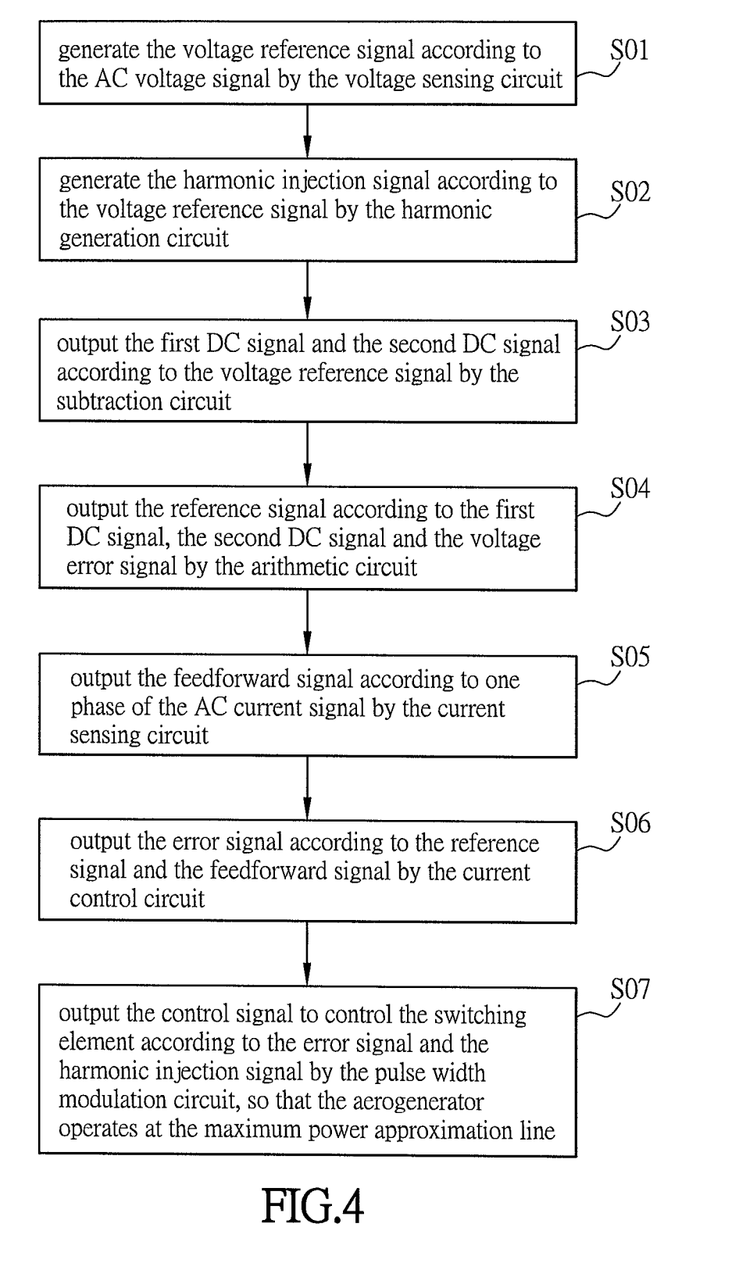
FIG. 4 is a schematic flowchart diagram of a control method of a power conversion apparatus of an embodiment of the invention.

FIG. 4 is a schematic flowchart diagram of a control method of a power conversion apparatus 2 of an embodiment of the invention.

As shown in FIGS. 2A to 2D and FIG. 4, the control method of the power conversion apparatus 2 of this invention is cooperated with the aerogenerator G, and the technical features of the power conversion apparatus 2 has been clearly illustrated in the above description, so they are omitted here for conciseness. The control method of the power conversion apparatus includes the steps S01~S07.

The step S01 is to generate the voltage reference signal $V_r$ according to the AC voltage signal $V_{WG}$ by the voltage sensing circuit 5.

Then, the step S02 is to generate the harmonic injection signal $V_{inj}$ according to the voltage reference signal $V_r$ by the harmonic generation circuit 6. In the step S02, the control method can further include a step of generating the filter signal $V_h$ by the high-pass filter unit 61 of the harmonic generation circuit 6 filtering out the low-frequency portion of the voltage reference signal $V_r$. Moreover, the inverting amplifier unit 62 of the harmonic generation circuit 6 inverts the phase of the filter signal $V_h$ to output the harmonic injection signal $V_{inj}$. The frequency of each of the voltage reference signal $V_r$ and the harmonic injection signal $V_{inj}$ is six times that of the AC voltage signal $V_{WG}$.

The step S03 is to output the first DC signal $V_f$ and the second DC signal $V_d$ according to the voltage reference signal $V_r$ by the subtraction circuit 71. In the step S03, the control method can further include a step of outputting the first DC signal $V_f$ according to the voltage reference signal $V_r$ by the low-pass filter unit 711 of the subtraction circuit 71. Moreover, the second DC signal $V_d$ is generated according to the first DC signal $V_f$ and the reference voltage $V_{ref}$ by the differential amplifier unit 712 of the subtraction circuit 71.

The step S04 is to output the reference signal $I_{ref}$ according to the first DC signal $V_f$, the second DC signal $V_d$ and the voltage error signal $V_e$ by the arithmetic circuit 72. Before the arithmetic circuit 72 outputs the reference signal $I_{ref}$ in the step S04, the control method can further include a step of outputting the voltage error signal $V_e$ according to the output voltage $V_O$ and the reference voltage $V_{ref}$ by the voltage feedback compensation circuit 76. Moreover, before the arithmetic circuit 72 outputs the reference signal $I_{ref}$ in the step S04, the control method can further include a step of multiplying the first DC signal $V_f$ by the voltage error signal $V_e$ and then dividing the product by the square of the second DC signal $V_d$ to obtain the reference signal $I_{ref}$ by the arithmetic circuit 72.

Besides, the step S05 is to output the feedforward signal $V_k$ according to one phase of the AC current signal $I_{WG}$ by the current sensing circuit 73. Herein, the current sensing circuit 73 outputs the feedforward signal $V_k$ according to the AC current signal $I_{WG\_A}$.

Then, the step S06 is to output the error signal $V_c$ according to the reference signal $I_{ref}$ and the feedforward signal $V_k$ by the current control circuit 74. Before the current control circuit 74 outputs the error signal $V_c$ in the step S06, the control method can further include a step of generating the control voltage $V_{MO}$ according to the reference signal $I_{ref}$ by the control resistor $R_{MO}$, and the control voltage $V_{MO}$ being directly proportional to the reference signal $I_{ref}$.

The step S07 is to output the control signal CS to control the switching element S according to the error signal $V_c$ and the harmonic injection signal $V_{inj}$ by the pulse width modulation circuit 75, so that the aerogenerator G operates at the maximum power approximation line. The error signal $V_c$ and the harmonic injection signal $V_{inj}$ are added together and then inputted to the pulse width modulation circuit 75, so that the pulse width modulation circuit 75 generates the control signal CS.

Since other technical features of the control method of the power conversion apparatus 2 have been clearly illustrated in the above description, they are omitted here for conciseness.

Summarily, in the power conversion apparatus and the control method thereof of the invention, the AC/DC conversion circuit of the power conversion apparatus receives the AC signal and outputs an output voltage, and has a switching element. The control module includes a voltage sensing circuit, a harmonic generation circuit and a maximum power tracking circuit. The voltage sensing circuit generates a voltage reference signal according to the AC voltage signal. The harmonic generation circuit generates a harmonic injection signal according to the voltage reference signal. The maximum power tracking circuit includes a subtraction circuit, an arithmetic circuit, a current sensing circuit, a current control circuit and a pulse width modulation circuit. The subtraction circuit outputs a first DC signal and a second DC signal according to the voltage reference signal. The arithmetic circuit outputs a reference signal according to the first DC signal, the second DC signal and the voltage error signal. The current sensing circuit outputs a feedforward signal according to one phase of the AC current signal. The current control circuit outputs an error signal according to the reference signal and the feedforward signal. The pulse width modulation circuit outputs a control signal to control the switching element according to the error signal and the harmonic injection signal, so that the aerogenerator operates at the maximum power approximation line. Thereby, in comparison with the conventional art, the power conversion apparatus of this invention not only is a single-stage aerogeneration power converter, but also can achieve the functions of the maximum power limitation and three-phase power factor correction of the aerogenerator, and besides, have advantages such as less components, lower cost and simpler control.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A power conversion apparatus cooperated with an aerogenerator being controlled to operate at a maximum power approximation line, said power conversion apparatus outputting an AC signal including an AC voltage signal and an AC current signal, comprising:
   an AC/DC conversion circuit receiving the AC signal and outputting a voltage signal and including a switching element; and
   a control module including:
      a voltage sensing circuit generating a voltage reference signal according to the AC voltage signal;
      a harmonic generation circuit generating a harmonic injection signal according to the voltage reference signal; and
      a maximum power tracking circuit including:
         a subtraction circuit outputting a first DC signal and a second DC signal according to the voltage reference signal;
         an arithmetic circuit outputting a reference signal according to the first DC signal, the second DC signal and a voltage error signal;
         a current sensing circuit outputting a feedforward signal according to one phase of the AC current signal;
         a current control circuit outputting an error signal according to the reference signal and the feedforward signal; and
         a pulse width modulation circuit outputting a control signal to control the switching element according to the error signal and the harmonic injection signal, so that the aerogenerator operates at the maximum power approximation line.

2. The power conversion apparatus as recited in claim 1, wherein the AC/DC conversion circuit is a three-phase single-switch boost converter.

3. The power conversion apparatus as recited in claim 1, wherein the maximum power tracking circuit further includes a voltage feedback compensation circuit, which outputs the voltage error signal according to the output voltage and a reference voltage.

4. The power conversion apparatus as recited in claim 3, wherein the voltage feedback compensation circuit includes a voltage division unit and an error amplifier unit, the voltage division unit executes a voltage division to the output voltage to output a voltage division signal, the voltage division signal is inputted to the negative end of the error amplifier unit, and the reference voltage is inputted to the positive end of the error amplifier unit.

5. The power conversion apparatus as recited in claim 4, wherein the error amplifier unit makes the voltage value of the voltage division signal and the waveform thereof substantially the same as the reference voltage.

6. The power conversion apparatus as recited in claim 1, wherein the subtraction circuit includes a low-pass filter unit and a differential amplifier unit, the low-pass filter unit outputs the first DC signal according to the voltage reference signal, and the differential amplifier unit generates the second DC signal according to the first DC signal and a reference voltage.

7. The power conversion apparatus as recited in claim 1, wherein the arithmetic circuit multiplies the first DC signal by the voltage error signal and then divide the product by the square of the second DC signal to obtain the reference signal.

8. The power conversion apparatus as recited in claim 7, wherein the maximum power tracking circuit further includes a control resistor, which generates a control voltage according to the reference signal, and the control voltage is directly proportional to the reference signal.

9. The power conversion apparatus as recited in claim 8, wherein the current control circuit makes the voltage value of the feedforward signal and the waveform thereof substantially the same as the control voltage.

10. The power conversion apparatus as recited in claim 1, wherein the voltage sensing circuit reduce the voltage of the AC voltage signal and rectifies the AC voltage signal to output the voltage reference signal.

11. The power conversion apparatus as recited in claim 10, wherein the harmonic generation circuit includes a high-pass filter unit and an inverting amplifier unit, the high-pass filter unit filters out the low-frequency portion of the voltage reference signal to generate a filter signal, and the inverting amplifier unit inverts the phase of the filter signal to output the harmonic injection signal.

12. The power conversion apparatus as recited in claim 11, wherein the error signal and the harmonic injection signal are added together and then inputted to the pulse width modulation circuit.

13. The power conversion apparatus as recited in claim 11, wherein the frequency of any of the voltage reference signal and the harmonic injection signal is six times that of the AC voltage signal.

14. A control method of a power conversion apparatus cooperated with an aerogenerator being controlled to operate at a maximum power approximation line, said power conversion apparatus outputting an AC signal including an AC voltage signal and an AC current signal, wherein the power conversion apparatus includes an AC/DC conversion circuit and a control module, the AC/DC conversion circuit receives the AC signal and outputs a voltage signal and includes a switching element, the control module includes a voltage sensing circuit, a harmonic generation circuit and a maximum power tracking circuit including a subtraction circuit, an arithmetic circuit, a current sensing circuit, a current control circuit and a pulse width modulation circuit, the control method comprising steps of:
   generating a voltage reference signal according to the AC voltage signal by the voltage sensing circuit;
   generating a harmonic injection signal according to the voltage reference signal by the harmonic generation circuit;
   outputting a first DC signal and a second DC signal according to the voltage reference signal by the subtraction circuit;
   outputting a reference signal according to the first DC signal, the second DC signal and a voltage error signal by the arithmetic circuit;
   outputting a feedforward signal according to one phase of the AC current signal by the current sensing circuit;
   outputting an error signal according to the reference signal and the feedforward signal by the current control circuit; and
   outputting a control signal to control the switching element according to the error signal and the harmonic injection signal by the pulse width modulation circuit, so that the aerogenerator operates at the maximum power approximation line.

15. The control method as recited in claim 14, before the subtraction circuit outputs the second DC signal, further comprising steps of:
   outputting the first DC signal according to the voltage reference signal by a low-pass filter unit of the subtraction circuit; and generating the second DC signal according to the first DC signal and a reference voltage by a differential amplifier unit of the subtraction circuit.

16. The control method as recited in claim 15, before the arithmetic circuit outputs the reference signal, further comprising a step of:

multiplying the first DC signal by the voltage error signal and then dividing the product by the square of the second DC signal to obtain the reference signal by the arithmetic circuit.

17. The control method as recited in claim 16, before the current control circuit outputs the error signal, further comprising a step of:

generating a control voltage according to the reference signal by a control resistor, and the control voltage being directly proportional to the reference signal.

18. The control method as recited in claim 14, in the step of generating the harmonic injection signal by the harmonic generation circuit, further comprising steps of:

generating a filter signal by a high-pass filter unit of the harmonic generation circuit filtering out the low-frequency portion of the voltage reference signal; and inverting the phase of the filter signal by an inverting amplifier unit of the harmonic generation circuit to output the harmonic injection signal.

19. The control method as recited in claim 18, wherein the error signal and the harmonic injection signal are added together and then inputted to the pulse width modulation circuit.

20. The control method as recited in claim 18, wherein the frequency of each of the voltage reference signal and the harmonic injection signal is six times that of the AC voltage signal.

* * * * *